(12) United States Patent
Walter

(10) Patent No.: US 11,761,878 B2
(45) Date of Patent: Sep. 19, 2023

(54) METHOD FOR DETERMINING A CHARACTERISTIC OF PARTICLES IN A FLUID SAMPLE AND/OR FOR DETERMINING A CONTAMINATION CHARACTERISTIC OF THE FLUID SAMPLE

(71) Applicant: UNISERS LTD, Zurich (CH)

(72) Inventor: Fabian Walter, Zurich (CH)

(73) Assignee: UNISERS LTD, Zürich (CH)

( * ) Notice: Subject to any disclaimer, the term of this patent is extended or adjusted under 35 U.S.C. 154(b) by 45 days.

(21) Appl. No.: 17/605,032

(22) PCT Filed: May 13, 2019

(86) PCT No.: PCT/IB2019/053934
§ 371 (c)(1),
(2) Date: Oct. 20, 2021

(87) PCT Pub. No.: WO2020/229876
PCT Pub. Date: Nov. 19, 2020

(65) Prior Publication Data
US 2022/0214263 A1  Jul. 7, 2022

(51) Int. Cl.
*G01N 15/14* (2006.01)

(52) U.S. Cl.
CPC . *G01N 15/1425* (2013.01); *G01N 2015/1443* (2013.01); *G01N 2015/1488* (2013.01); *G01N 2015/1493* (2013.01)

(58) Field of Classification Search
CPC .............. G01N 15/0205; G01N 15/00; G01N 15/0612; G01N 15/1425; G01N 15/0211;
(Continued)

(56) References Cited

U.S. PATENT DOCUMENTS

2017/0269071 A1* 9/2017 Sato ..................... G01N 33/543
2017/0292934 A1* 10/2017 Azpiroz ........... G01N 27/44791
(Continued)

FOREIGN PATENT DOCUMENTS

WO   WO-2020153955 A1 * 7/2020  ......... G01N 15/0656

OTHER PUBLICATIONS

International Search Report for PCT/IB2019/053934 dated Jan. 27, 2020.
(Continued)

*Primary Examiner* — Sang H Nguyen
(74) *Attorney, Agent, or Firm* — Pearne & Gordon LLP

(57) ABSTRACT

A method for determining a characteristic of particles in a fluid sample and/or a contamination characteristic of the fluid sample includes: (a) depositing a metallic film on a surface of a substrate; (b) bringing the fluid sample into contact with the metallic surface; (c) removing the fluid sample from the metallic surface; (d) depositing a layer of metal on the metallic surface and the particles which remained on the metallic surface; (e) illuminating the layers of metal on the particles and metallic surface with electromagnetic rays; or illuminating the layers of metal with electromagnetic rays; (f) receiving the scattered electromagnetic rays at an array of photodiodes; or receiving the reflected electromagnetic rays at an array of photodiodes; (g) forming an image which includes pixels; and (h) processing the formed image to determine a characteristic of the particles and/or a contamination characteristic of the fluid sample.

14 Claims, 3 Drawing Sheets

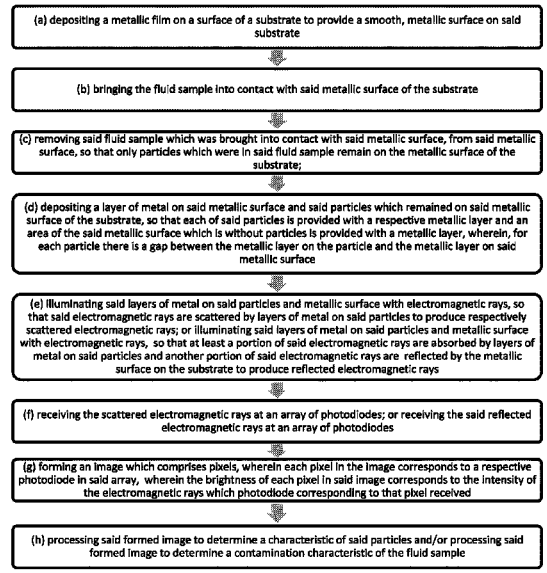

(58) Field of Classification Search
CPC ... G01N 2015/1443; G01N 2015/1493; G01N 2015/1488; G01N 1/2813
See application file for complete search history.

(56) References Cited

U.S. PATENT DOCUMENTS

2019/0094113 A1* 3/2019 Huang ............... G01N 15/1434
2020/0049617 A1* 2/2020 Boutami ............ G01N 15/1436
2020/0378875 A1* 12/2020 Chou ....................... G01N 1/36

OTHER PUBLICATIONS

Written Opinion for PCT/IB2019/053934 dated Jan. 27, 2020.
Masao Gen et al.: "Electrospray surface-enhanced Raman spectroscopy (ES-SERS) for probing surface chemical compositions of atmospherically relevant particles", Atmospheric Chemistry and Physics, Nov. 24, 2017, pp. 14025-14037, vol. 17, No. 22, XP055658319.

* cited by examiner (a) depositing a metallic film on a surface of a substrate to provide a smooth, metallic surface on said substrate

(b) bringing the fluid sample into contact with said metallic surface of the substrate

(c) removing said fluid sample which was brought into contact with said metallic surface, from said metallic surface, so that only particles which were in said fluid sample remain on the metallic surface of the substrate;

(d) depositing a layer of metal on said metallic surface and said particles which remained on said metallic surface of the substrate, so that each of said particles is provided with a respective metallic layer and an area of the said metallic surface which is without particles is provided with a metallic layer, wherein, for each particle there is a gap between the metallic layer on the particle and the metallic layer on said metallic surface

(e) illuminating said layers of metal on said particles and metallic surface with electromagnetic rays, so that said electromagnetic rays are scattered by layers of metal on said particles to produce respectively scattered electromagnetic rays; or illuminating said layers of metal on said particles and metallic surface with electromagnetic rays, so that at least a portion of said electromagnetic rays are absorbed by layers of metal on said particles and another portion of said electromagnetic rays are reflected by the metallic surface on the substrate to produce reflected electromagnetic rays

(f) receiving the scattered electromagnetic rays at an array of photodiodes; or receiving the said reflected electromagnetic rays at an array of photodiodes

(g) forming an image which comprises pixels, wherein each pixel in the image corresponds to a respective photodiode in said array, wherein the brightness of each pixel in said image corresponds to the intensity of the electromagnetic rays which photodiode corresponding to that pixel received

(h) processing said formed image to determine a characteristic of said particles and/or processing said formed image to determine a contamination characteristic of the fluid sample

Figure 1

(a) depositing a metallic film on a surface of a substrate to provide a smooth, metallic surface on said substrate

(b) bringing the fluid sample into contact with said metallic surface of the substrate

(c) removing said fluid sample which was brought into contact with said metallic surface, from said metallic surface, so that only particles which were in said fluid sample remain on the metallic surface of the substrate

(d) depositing a layer of metal on said metallic surface and said particles which remained on said metallic surface of the substrate, so that each of said particles is provided with a respective metallic layer and an area of the said metallic surface which is without particles is provided with a metallic layer, wherein, for each particle there is a gap between the metallic layer on the particle and the metallic layer on said metallic surface

(e) illuminating said layers of metal on said particles and metallic surface with electromagnetic rays, so that said electromagnetic rays are scattered by layers of metal on said particles to produce scattered electromagnetic rays;

(f) receiving the scattered electromagnetic rays at an array of photodiodes

(g) forming a dark field image which comprises pixels, wherein each pixel in the image corresponds to a respective photodiode in said array, wherein the brightness of each pixel in said image corresponds to the intensity of the scattered light which photodiode corresponding to that pixel received

(h) processing said dark field image to determine a characteristic of said particles and/or processing said dark field image to determine a contamination characteristic of the fluid sample

Figure 2

(a) depositing a metallic film on a surface of a substrate to provide a smooth, metallic surface on said substrate (b) bringing the fluid sample into contact with said metallic surface of the substrate (c) removing said fluid sample which was brought into contact with said metallic surface, from said metallic surface, so that only particles which were in said fluid sample remain on the metallic surface of the substrate;

(d) depositing a layer of metal on said metallic surface and said particles which remained on said metallic surface of the substrate, so that each of said particles is provided with a respective metallic layer and an area of the said metallic surface which is without particles is provided with a metallic layer, wherein, for each particle there is a gap between the metallic layer on the particle and the metallic layer on said metallic surface (e) illuminating said layers of metal on said particles and metallic surface with electromagnetic rays, so that at least a portion of said electromagnetic rays are absorbed by layers of metal on said particles and another portion of the electromagnetic rays are reflected by the metallic surface on the substrate to produce reflected electromagnetic rays (f) receiving the reflected electromagnetic rays at an array of photodiodes (g) forming an bright field image which comprises pixels, wherein each pixel in the bright field image corresponds to a respective photodiode in said array, wherein the brightness of each pixel in said bright field image corresponds to the intensity of the light which photodiode corresponding to that pixel received (h) processing said bright field image to determine a characteristic of said particles and/or processing said bright field image to determine a contamination characteristic of the fluid sample

METHOD FOR DETERMINING A CHARACTERISTIC OF PARTICLES IN A FLUID SAMPLE AND/OR FOR DETERMINING A CONTAMINATION CHARACTERISTIC OF THE FLUID SAMPLE

FIELD OF THE INVENTION

The present invention concerns a method for determining a characteristic of particles in a fluid sample; and in particular, but not exclusively, concerns a method which involves providing a metal layer on particles which have clung to a metallic surface of a substrate and on the metallic surface of the substrate; illuminating said metallic layers on particles and metallic surface of the substrate with electromagnetic rays; forming an image using the scattered electromagnetic rays or reflected electromagnetic rays; and processing said image to determine a characteristic of particles in a fluid sample and/or to determine a contamination characteristic of the fluid sample.

DESCRIPTION OF RELATED ART

Existing techniques for characterizing particles, which define impurities in a sample fluid, are insufficient. For example, existing techniques determining the concentration of particles in a sample fluid are insufficient.

Dark-field imaging based on optical scattering is widely used to detect particles deposited on a surface. Optical scattering cross section is proportional to the sixth power of the particle radius. Therefore, detection of small particles (e.g. particles with radii less than 50-nm-diameter) requires strong illumination sources and sensitive photodiodes. Furthermore, methods which use strong illumination sources and sensitive photodiodes are very sensitive to background noise coming from intrinsic defects on the surface (such as surface roughness). Disadvantageously, both a deposited particle and surface roughness can scatter light in a similar intensity, making it challenging to discriminate between a particle deposited on the surface and surface roughness.

In another approach bright-field imaging based on optical absorption and scattering is used to detect particles deposited on a surface; in this approach reflected light is collected and is used to form a bright-field image, and the presence of particles is then detected from this bright field image. Particles on a surface lead to darker tones of pixels in the bright-field images due to their light absorption. In this case, the background signal is bright as the reflection from the flat surface is stronger. However, most particles have a very small light absorption making it difficult to detect them using this bright-field imaging technique.

It is an aim of the present invention to mitigate or obviate the disadvantages associated with said existing techniques.

BRIEF SUMMARY OF THE INVENTION

According to the invention, these aims are achieved by means of a method having the steps recited in the independent claim 1 of the present application; wherein the dependent claims recite optional features of preferred embodiments.

Advantageously, in the method of the present invention amplified scattering and absorption of light by particles (which defined impurities in a fluid sample) is achieved; accordingly, more accurate detection of characteristics of said particles from optical images (e.g. dark field images; and/or bright field images) can be achieved.

BRIEF DESCRIPTION OF THE DRAWINGS

The invention will be better understood with the aid of the description of an embodiment given by way of example and illustrated by the figures, in which:

FIG. 1 shows a flow diagram of the steps taken in when performing a method according to preset invention;

FIG. 2 shows a flow diagram of the steps taken in when performing a method according to an embodiment of the preset invention;

FIG. 3 shows a flow diagram of the steps taken in when performing a method according to a further embodiment of the preset invention.

DETAILED DESCRIPTION OF POSSIBLE EMBODIMENTS OF THE INVENTION

A method for determining a characteristic of particles in a fluid sample, and/or for determining a contamination characteristic of the fluid sample, the method comprising the steps of, (a) depositing a metallic film on a surface of a substrate to provide a smooth, metallic surface on said substrate;

(b) bringing the fluid sample into contact with said metallic surface of the substrate;

(c) removing said fluid sample which was brought into contact with said metallic surface, from said metallic surface, so that only particles which were in said fluid sample remain on the metallic surface of the substrate;

(d) depositing a layer of metal on said metallic surface and said particles which remained on said metallic surface of the substrate, so that each of said particles is provided with a respective metallic layer and an area of the said metallic surface which is without particles is provided with a metallic layer, wherein, for each particle there is a gap between the metallic layer on the particle and the metallic layer on said metallic surface;

(e) illuminating said layers of metal on said particles and metallic surface with electromagnetic rays, so that said electromagnetic rays are scattered by layers of metal on said particles to produce respectively scattered electromagnetic rays; or illuminating said layers of metal on said particles and metallic surface with electromagnetic rays, so that at least a portion of said electromagnetic rays are absorbed by layers of metal on said particles and another portion of said electromagnetic rays are reflected by the metallic surface on the substrate to produce reflected electromagnetic rays;

(f) receiving the scattered electromagnetic rays at an array of photodiodes; or receiving the said reflected electromagnetic rays at an array of photodiodes;

(g) forming an image which comprises pixels, wherein each pixel in the image corresponds to a respective photodiode in said array, wherein the brightness of each pixel in said image corresponds to the intensity of the electromagnetic rays which photodiode corresponding to that pixel received;

(h) processing said formed image to determine a characteristic of said particles, and/or processing said formed image to determine a contamination characteristic of the fluid sample.

In one embodiment the method comprises the steps of (a) depositing a metallic film on a surface of a substrate to provide a smooth, metallic surface on said substrate;

(b) bringing the fluid sample into contact with said metallic surface of the substrate, (c) removing said fluid sample which was brought into contact with said metallic surface, from said metallic surface, so that only particles which were in said fluid sample remain on the metallic surface of the substrate (d) depositing a layer of metal on said metallic surface and said particles which remained on said metallic surface of the substrate, so that each of said particles is provided with a respective metallic layer and an area of said metallic surface which is without particles is provided with a metallic layer, wherein, for each particle there is a gap between the metallic layer on the particle and the metallic layer on said metallic surface;

(e) illuminating said layers of metal on said particles and metallic surface with electromagnetic rays, so that said electromagnetic rays are scattered by layers of metal on said particles to produce scattered electromagnetic rays;

(f) receiving the scattered electromagnetic rays at an array of photodiodes;

(g) forming a dark field image which comprises pixels, wherein each pixel in the image corresponds to a respective photodiode in said array, wherein the brightness of each pixel in said image corresponds to the intensity of the scattered light which photodiode corresponding to that pixel received;

(h) processing said dark field image to determine a characteristic of said particles and/or processing said dark field image to determine a contamination characteristic of the fluid sample.

Preferably the scattered electromagnetic rays are Rayleigh scattered electromagnetic rays.

In another embodiment the method comprises the steps of (a) depositing a metallic film on a surface of a substrate to provide a smooth, metallic surface on said substrate;

(b) bringing the fluid sample into contact with said metallic surface of the substrate, (c) removing said fluid sample which was brought into contact with said metallic surface, from said metallic surface, so that only particles which were in said fluid sample remain on the metallic surface of the substrate (d) depositing a layer of metal on said metallic surface and said particles which remained on said metallic surface of the substrate, so that each of said particles is provided with a respective metallic layer and an area of the said metallic surface which is without particles is provided with a metallic layer, wherein, for each particle there is a gap between the metallic layer on the particle and the metallic layer on said metallic surface;

(e) illuminating said layers of metal on said particles and metallic surface with electromagnetic rays, so that at least a portion of said electromagnetic rays are absorbed by layers of metal on said particles and another portion of the electromagnetic rays are reflected by the metallic surface on the substrate to produce reflected electromagnetic rays;

(f) receiving the reflected electromagnetic rays at an array of photodiodes;

(g) forming a bright field image which comprises pixels, wherein each pixel in the bright field image corresponds to a respective photodiode in said array, wherein the brightness of each pixel in said bright field image corresponds to the intensity of the light which photodiode corresponding to that pixel received;

(h) processing said bright field image to determine a characteristic of said particles, and/or processing said bright field image to determine a contamination characteristic of the fluid sample.

In a preferred embodiment the contamination characteristic of the fluid sample which is determined is the capacity of the fluid sample to contaminate a surface. For example in a preferred embodiment the contamination characteristic of the fluid sample which is determined is the statistical probability of the fluid sample contaminating a surface (contaminating a surface includes, but it not limited to, depositing unwanted particles on the surface and/or generating defects on the surface).

In an embodiment of the present invention the particles may be insoluble in the fluid sample. In an embodiment of the present invention the particles may be solvable in the fluid sample. In yet another embodiment, the particles comprise particles which are insoluble in the fluid sample and particles which are solvable in the fluid sample.

Step (a)—Depositing a Metallic Film on the Surface of the Substrate:

Preferably the step of depositing a metallic film on a surface of a substrate to provide a smooth, metallic surface on said substrate comprises first providing a substrate. In the preferred embodiment the substrate is preferably rigid; and more preferably the surface of the substrate will be without any foreign particles (such as dust or dirt), in other words the surface of the substrate is preferably clean. If the surface of the substrate is clean then the step of depositing a metallic film on a surface of a substrate preferably comprises depositing a metallic film with a thickness greater than 30 nm, and more preferably with a thickness greater than 50 nm. It should be understood that the substrate may take any suitable form; in one embodiment the substrate is a silicon wafer; or alternatively the substrate may comprise metal.

It should be understood that a substrate of any suitable size may be provided; however more preferably the substrate will be at least 1 cm in diameter so as to avoid the edge region with a different surface energy. More preferably the size of the substrate will be between 2.5 cm (1 inch) and 450 cm (17.7 inch). In yet another embodiment the substrate can also be a diced section of a larger substrate (for example a segment of a larger wafer). In this case, the size of diced wafer pieces will be preferably bigger than 1 cm×1 cm. The substrate may comprise silicon, metal, plastic, glass and/or quartz. Most preferably the substrate will be a silicon wafer.

The metallic film may comprise any suitable material. The metallic film may comprise a single type of metal or a composition of different metals such as alloys. Typically, the composition of the metallic film will depend on the composition of the fluid sample. For example, if the fluid sample comprises acids such as $H_2SO_4$ or HCl then the metallic film will preferably comprise gold or platinum; if the fluid sample comprises $H_2SO_4$ and/or $H_2O_2$ (Piranha solution) then the metallic film will preferably comprise gold or platinum; if the sample comprises Ultrapure water (UPW) then the metallic film will preferably comprise gold or platinum. In yet another example, if the fluid sample is not corrosive (e.g. if the sample fluid comprises isopropanol), then the metallic film may comprise metals such as silver, copper, and/or aluminium etc.

Preferably, the metallic film further comprises a native oxide layer.

In an embodiment the method further comprises the step of providing a sticking layer on the surface of the substrate; and then providing the metallic film on the sticking layer. In this embodiment the metallic film is not applied directly to the surface of the substrate but rather is applied to the sticking layer; accordingly, in this embodiment the metallic film is deposited indirectly on the surface of the substrate. Typically, the step of providing a sticking layer on the surface of the substrate is carried out when using metallic films which are expected to have a low adhesion to the surface of the substrate. The sticking layer may comprise Chromium (Cr) and/or Titanium (Ti). For example, the method may further comprise the step of depositing a sticking layer comprising Cr or Ti on the surface of the substrate; and then depositing the metallic film on the Cr or Ti sticking layer. Preferably the sticking layer will have a thickness greater than 5 nm. It is also preferable to clean the surface of the substrate before the depositing the sticking layer; the step of cleaning the surface of the substrate may comprise cleaning the surface of the substrate with glow discharge, cleaning the surface of the substrate with oxygen plasma, by cleaning the surface of the substrate using a wet cleaning process, with UV-light, or by performing any combination of the aforementioned cleaning steps.

It should be understood that the metallic film could be deposited on the surface of the substrate (or on the sticking layer) using any suitable deposition method. In an embodiment the step of depositing the metallic film may comprise depositing the metallic film using physical vapor deposition (PVD); for example, the step of depositing the metallic film may comprise depositing the metallic film using e-beam evaporation, thermal evaporation, pulsed laser deposition, cathodic arc deposition or sputtering. In yet another embodiment the step of depositing the metallic film may comprise depositing the metallic film using chemical vapor deposition (CVD). In yet another embodiment the step of depositing the metallic film may comprise depositing the metallic film by electroplating said surface of the substrate with the metallic film. In yet another embodiment the step of depositing the metallic film may comprise depositing the metallic film by Atomic layer deposition (ALD).

Typically the metallic film is deposited at a deposition rate of between 1-3 angstroms per second; and most preferably the metallic film is deposited at a deposition rate of 2 angstroms per second.

Preferably, the substrate with the metallic film is used substantially immediately after the metallic film has been provided on the surface of the substrate, so as to limit contamination. In other words the next step in the process is carried out substantially immediately after the metallic film has been provided on the surface of the substrate.

Often after the metallic film has been deposited on the surface of the substrate, the substrate is then stored for some time before it is used in the subsequent steps of the method of the present invention. While in storage foreign particles may collect on the metallic film, therefore after taking the substrate out of storage the metallic film is preferably cleaned before it is used in the subsequent steps of the method of the present invention. Most preferably after the substrate is taken out of storage, the metallic film is cleaned using a suitable cleaning method before it is used in the subsequent steps of the method of the present invention (i.e. before bringing the sample fluid in direct contact with the metallic surface so that particles in said fluid sample can cling to said metallic surface, is carried out). The cleaning step is preferably not damaging or oxidizing the metallic film. Most preferably the metallic film on the surface of the substrate is cleaned using air or oxygen plasma; for example oxygen plasma may be applied to the metallic film for a duration of 1 second to 15 seconds if the metal is stable (such as gold) under short oxygen plasma exposure. It is not recommended to apply oxygen plasma to metals such as silver, as their surface will be chemically altered due to oxygen plasma.

Step (b)—Bringing Said Fluid Sample into Contact with Said Metallic Surface of the Substrate:

After a metallic film has been deposited directly on a surface of a substrate (or deposited indirectly on the surface of the substrate by depositing the metallic film on a sticking layer which is provided on the surface of the substrate) to provide a smooth, metallic surface on said substrate, then a step of bringing said fluid sample into contact with said metallic surface of the substrate is carried out. As will be described in more detail below, the step of bringing said fluid sample into contact with said metallic surface of the substrate may be carried out a plurality of different ways; for example, a predefined amount of said fluid sample can be dispensed on said metallic surface while said metallic surface is stationary; or a predefined amount of said fluid sample can be dispensed on said metallic surface while said metallic surface is spinning; or said substrate can be provided in a chamber which contains a gas which defines the fluid sample, so that the metallic surface of the substrate is exposed to the gaseous fluid sample (preferably for a predefined length of time).

The fluid sample may comprise any suitable composition; the fluid sample may comprise a gas, a liquid or a photoresist (polymer resin, which maybe dissolved in a solvent). For example, if the fluid sample is a liquid it may comprise any one or more of ultrapure water (UPW), alcohol, acid, ionic solutions, oxidizer, and/or any mixture of these. For example, if the fluid sample is a gas it may comprise any one or more of N2, O2, CO2, Ar, He, NH3 or any process gas used in semiconductors industry. The manner in which the step of bringing said fluid sample into contact with said metallic surface of the substrate is carried out may vary depending on whether the fluid sample is a liquid, or photoresist, or a gas.

In one embodiment, wherein the fluid sample comprises a liquid, the substrate is spun and the fluid sample is dispensed onto the metallic surface of the substrate while the substrate is spinning. Preferably the substrate is spun at a non-zero speed below 400 rpm. Most preferably the sample fluid is spread over the entire metallic surface of said substrate (typically the spinning of the substrate will cause the sample fluid to spread over the entire metallic surface of the substrate). Particles (which define impurities) present in the fluid sample cling to the metallic surface of the substrate as the fluid sample contacts the metallic surface of the substrate. In another embodiment, wherein the fluid sample comprises a liquid, the substrate is stationary (i.e. has a fixed position, and is not spinning) and the fluid sample is dispensed onto the metallic surface of the substrate. Preferably the fluid sample which is dispensed onto the metallic surface of the substrate is arranged to cover the entire surface of said metallic surface. Particles (which define impurities) present in the fluid sample cling to the metallic surface of the substrate as the fluid sample contacts the metallic surface of the substrate.

In one embodiment, wherein the fluid sample comprises a gas, the substrate is simply placed into an enclosure which contains the gas sample for a predefined length of time. The length of time, at which the substrate is exposed to the gas should preferably reflect the length of time that an object in production, such as a silicon wafer for the semiconductor industry, is exposed to said gas sample in said enclosure. In the enclosure, particles (which define impurities) present in the gaseous fluid sample will deposit on the metallic surface of the substrate during the predefined time while the metallic surface of the substrate is exposed to the gaseous fluid sample. In another embodiment, in addition to the particles which cling to the metallic surface, other molecules can condense or re-solidify on the metallic surface of the substrate.

In another embodiment, wherein the fluid sample comprises a liquid, the substrate is simply submersed into a container which contains the fluid sample for a predefined length of time. The predefined length of time which the substrate is exposed to the liquid should preferably reflect the length of time that an object in production, such as a silicon wafer for the semiconductor industry is exposed to said liquid sample in said container; ideally the predefined length of time depends on the application, purity of liquid, and/or metallic surface; most preferably the predefined length of time will maximize the correlation between particles on surface and particles in liquid; most preferably the predefined length of time is not so short as to have large variance for the same liquid, and is not so long so that it leads to having the same number of particles on the metallic surface for different purity level of liquids. In the container, particles (which define impurities) present in the liquid fluid sample will cling to the metallic surface of the substrate during the predefined time the metallic surface of the substrate is submersed in the liquid fluid sample.

In another embodiment, wherein the fluid sample comprises a liquid, the method comprises the step of arranging the substrate in a tilted orientation; and the step of bringing said fluid sample into contact with said metallic surface of the substrate is carried out while the substrate is maintained in its tilted orientation. In this embodiment, the fluid sample is dispensed onto the metallic surface of the substrate; as the substrate is in a tilted orientation, the fluid sample which is dispensed onto the metallic surface will flow, under the influence of gravity, off the metallic surface.

In one embodiment, wherein the fluid sample comprises a photoresist (e.g. a polymer resin, which is preferably dissolved in a solvent), the substrate is spun and the photoresist is dispensed onto the metallic surface of the substrate while the substrate is spinning. Preferably the substrate is spun at a non-zero speed below 400 rpm. Most preferably the photoresist is spread over the entire metallic surface of said substrate (typically the spinning of the substrate will cause the photoresist) to spread over the entire metallic surface of the substrate).

In another embodiment, wherein the fluid sample comprises a photoresist (polymer resin, which is preferably dissolved in a solvent), the substrate is stationary (i.e. has a fixed position, and is not spinning) and the photoresist is dispensed onto the metallic surface of the substrate. Preferably the photoresist which is dispensed onto the metallic surface of the substrate is arranged to covering the entire surface of said metallic surface.

In another embodiment, wherein sample fluid comprises a liquid, the step of bringing said fluid sample into contact with said metallic surface of the substrate, comprises providing the fluid sample onto the metallic surface of the substrate by dispensing the fluid sample, drop-wise, from a dispenser tip which is without contamination (preferably the dispenser tip is composed of a chemically stable plastic such Perfluoroalkoxy alkanes (PFA) or Polytetrafluoroethylene (PTFE) for example). Most preferably the volume of each drop which is dispensed from the tip is within a predefined range (preferably the predefined range is 1-100 microliters); the volume of each drop can be controlled using any suitable means known in the art, such as for example using a pump (e.g. syringe pump), flowmeter, a camera imaging the droplet, a scale measuring the weight of the droplet etc. Most preferably the rate at which the successive drops are dispensed from a dispenser tip onto the metallic surface of the substrate is within a predefined range (preferably the predefined range is 1-240 seconds).

Step (c)—Removing Said Fluid Sample which was Brought into Contact with Said Metallic Surface, from Said Metallic Surface, so that Only Particles which were in Said Fluid Sample Remain on the Metallic Surface of the Substrate:

In one embodiment wherein said fluid sample was brought into contact with the metallic surface of the substrate as the substrate is spun (e.g. at a non-zero speed below 400 rpm), the step of removing said fluid sample which was brought into contact with said metallic surface, from said metallic surface, so that only particles which were in said fluid sample remain on the metallic surface of the substrate, comprises increasing the speed of rotation. Most preferably the speed of rotation of the substrate is increased to a speed in the range 1000 rpm and 4000 rpm. In this embodiment, most of said liquid fluid sample is removed from said metallic surface by centrifugal force and some by evaporation. After the sample fluid is removed, only particles (which define impurities in the fluid sample) remain clung on said metallic surface of the substrate.

In another embodiment wherein said fluid sample was brought into contact with the metallic surface of the substrate as the substrate is stationary (i.e. not spinning), the step of removing said fluid sample which was brought into contact with said metallic surface, from said metallic surface, so that only particles which were in said fluid sample remain on the metallic surface of the substrate, comprises spinning the substrate. Most preferably the speed of rotation of the substrate is increased to a speed in the range 1000 rpm and 4000 rpm. This drying method is called as spin-drying. During this process, most of said liquid fluid sample is driven off of said metallic surface by centrifugal force and some with evaporation. In this embodiment, most of said liquid fluid sample is removed from said metallic surface by centrifugal force and some by evaporation. After the sample fluid is removed, only particles (which define impurities in the fluid sample) remain clung on said metallic surface of the substrate.

As already mentioned above, in another embodiment the substrate is arranged in a tilted orientation; and the step of removing said fluid sample which was brought into contact with said metallic surface, from said metallic surface, so that only particles which were in said fluid sample remain on the metallic surface of the substrate, comprises, allowing the fluid sample which was bought into contact with said metallic surface of the substrate to flow, under the influence of gravity, off the metallic surface. In a variation of this embodiment the method further comprises providing a flow of dry air which blows the fluid sample off the metallic surface; the flow of dry air is preferably provided using a pressurized air gun.

In one embodiment where said fluid sample comprises photoresist, the step of removing the fluid sample which was brought into contact with the metallic surface of the substrate comprises removing is the majority of the photoresist which was brought into contact with the metallic surface. The step of removing is the majority of the photoresist which was brought into contact with the metallic surface comprises spinning the substrate at a speed within a predefined range, for example spinning the substrate at a speed between 1000 rpm and 4000 rpm (either the substrate is spun from a stationary position to a speed within the predefined range or the substrate is already spinning the speed of spinning is increased to a speed within the predefined range). Spinning the substrate at a speed within said predefined range after the photoresist has been brought into contact with the metallic surface of the substrate will ensure that a photoresist is spread over the whole metallic surface of the substrate, thus forming a layer of photoresist on said metallic surface of the substrate; preferably the layer of photoresist will have uniform thickness. Most preferably the layer of photoresist will comprise a photoresist resin (which is preferably without any solvent). In an embodiment, the layer of photoresist may be baked on a hotplate to remove solvent from the layer of photoresist (the hot plate temperature is preferably between 60 and 160 degrees Celsius).

The method may further comprise the step of curing the layer of photoresist (curing the layer of photoresist changes the chemical structure of the photoresist such as, for example, polymerizing the photoresist); the step of curing the layer of photoresist may comprise providing using electromagnetic rays which are incident on the layer of photoresist or heating the layer of photoresist.

Spinning and curing steps depend on the type of the photoresist. Ideally, identical spinning and curing parameters which is actually used for the semiconductors fabrication process for the said photoresist sample are applied to estimate the contamination of the used spinning and curing process.

Preferably, the cured layer of photoresist is then removed. In one embodiment the layer of photoresist is removed using a dry process such as applying oxygen plasma to the layer of photoresist. The photoresist layer will comprise a polymeric matrix, and the application of oxygen plasma to the photoresist layer will remove said polymeric matrix.

After the polymeric matrix of the photoresist layer has been removed, particles (which define impurities in the photoresist) remain on said metallic surface of the substrate. The remaining particles represent the contamination capacity of said original fluid sample (i.e. the original photoresist which was brought into contact with the metallic surface of the substrate).

In one embodiment, due to chemical degradation of the polymer structure of the photoresist during its production or storage, particle residues may remain on the metallic surface of the substrate after the photoresist layer has been cured (e.g i.e. UV-treatment) and subsequently removed (e.g. removing the photoresist layer with TMAH, acetone or another wet-cleaning process). Most probable reason of such defects are originated from unsuccessful cross-linking of polymer during UV-treatment. In this case, majority of particles deposited on the surface after the overall process is not coming from particle impurities in photoresist, but simply defective polymer structure of the photoresist.

In another embodiment, the layer of photoresist on the metallic surface of the substrate is stripped (or removed) with a wet cleaning process; for example applying a TMAH (Tetramethylammonium hydroxide) to the layer of photoresist, or applying acetone to the layer of photoresist. The application of TMAH or acetone to the photoresist layer will remove said polymeric matrix. After the polymeric matrix of the photoresist layer has been removed, particles (which define impurities in the photoresist) remain on said metallic surface of the substrate. The remaining particles represent the contamination capacity of said original fluid sample (i.e. the original photoresist which was brought into contact with the metallic surface of the substrate) and TMAH or acetone collectively.

In the embodiment wherein the sample fluid is a gas, and said metallic surface was exposed to said gas in said enclosure, the step of removing the fluid sample which was brought into contact with the metallic surface of the substrate comprises removing the substrate from the enclosure. Most preferably the substrate is removed from the enclosure after a predefined period of time. After the substrate is removed from the enclosure the particles (which define impurities in the gas) will remain on said metallic surface of the substrate; said particle will comprise particles which have clung to the metallic surface and molecules which have condensed or re-solidified onto the metallic surface.

In said embodiment, wherein the fluid sample comprises a liquid, and the substrate is simply submersed into a container which contains the fluid sample for a predefined length of time, the step of removing the fluid sample which was brought into contact with the metallic surface of the substrate comprises, removing said substrate from said container of fluid sample. After the substrate is removed from the container, particles (which define impurities in the fluid sample) will remain on said metallic surface of the substrate. Most preferably the method further comprises the step of providing a flow of dry gas across the metallic surface, after the substrate has been removed from the container, so as to dry the metallic surface. For example the dry gas may comprise Nitrogen and/or Argon. And the flow of dry gas may be provided using a pressurized air gun.

In yet another embodiment, sample fluid comprises a liquid. In this embodiment the step of step of bringing said fluid sample into contact with said metallic surface of the substrate, comprises providing the fluid sample onto the metallic surface of the substrate by dispensing the fluid sample, drop-wise, from a dispenser tip which is without contamination (preferably the dispenser tip is composed of a chemically stable plastic such Perfluoroalkoxy alkanes (PFA) or Polytetrafluoroethylene (PTFE) for example). Most preferably the volume of each drop which is dispensed from the tip is within a predefined range (preferably the predefined range is 1-100 microliters); the volume of each drop can be controlled using any suitable means known in the art, such as for example using a pump (e.g. syringe pump), flowmeter, a camera imaging the droplet, a scale measuring the weight of the droplet etc. Most preferably the rate at which the successive drops are dispensed from a dispenser tip onto the metallic surface of the substrate is within a predefined range (preferably the predefined range is 1-240 seconds).

Referring to said embodiment wherein said sample fluid comprises a liquid, and wherein the step of bringing said fluid sample into contact with said metallic surface of the substrate comprises providing the fluid sample onto the metallic surface of the substrate by dispensing the fluid sample, drop-wise (each drop preferably having a predefined volume), from a dispenser tip, the step of removing the fluid sample which was brought into contact with the metallic surface of the substrate comprises, evaporating each respective drop after it is brought into contact with the metallic surface, or allowing a plurality of drops of sample fluid to come into contact with the metallic surface and then evaporating the plurality of drops collectively. In other words in one embodiment, after each successive drop is dispensed onto the metallic surface of the substrate the fluid in that drop is evaporated from the metallic surface of the substrate. In another embodiment, after each successive drop is dispensed onto the metallic surface of the substrate the fluid in that drop is partially evaporated (preferably 65%-90% of the volume of the drop is evaporated) from the metallic surface of the substrate before the next drop is dispensed onto the metallic surface of the substrate and is partially evaporated (these steps are preferably repeated for each successive drop which is dispensed onto the metallic surface). Alternatively in yet another embodiment, after all of the drops have been dispensed onto the metallic surface of the substrate the fluid in those drop is evaporated from the metallic surface of the substrate. In other words the evaporation of the fluid on the metallic surface of the substrate can be done either after each successive drop has being dispensed from the dispenser tip onto the metallic surface of the substrate, or alternative after all of the drops have being dispensed from the dispenser tip onto the metallic surface of the substrate. After the fluid has been evaporated, particles (which in this embodiment are non-volatile particles and molecules; and which define impurities) present in the liquid fluid sample remain clung to the metallic surface of the substrate. The step of evaporating each respective drop after it is brought into contact with the metallic surface, or, evaporating the plurality of drops collectively, comprises heating the drop/collective drops on the metallic surface using any suitable heating means. To summarize, as described in this paragraph, there are at least three variations for bringing said fluid sample, drop-wise, into contact with said metallic surface of the substrate: deposit all drops and evaporate all drops together; deposit a drop, partially evaporate that drop and then deposit the next drop, and repeat a plurality of times; deposit a drop, evaporate that drop completely, and then deposit the next drop, and repeat a plurality of time.

To facilitate fast evaporation of each drop of drop of sample fluid which has been dispensed onto the metallic surface of the substrate, or evaporation of a collective drops of sample fluid which has been dispensed onto the metallic surface of the substrate, the temperature of said metallic surface is increased (preferably to a value less than the boiling point of said liquid sample). Temperature is increased preferably with heat transfer from a heat source located under said substrate; said heat source is preferably arranged to be in mechanical contact with a surface of the substrate which is opposite to the metallic surface. In one embodiment the heat source comprises an electrical resistive heater. Most preferably the temperature of the heat source is less than the boiling point temperature of the fluid sample. In another embodiment the heat source is configured to emit electromagnetic rays which are incident on the metallic surface to heat the metallic surface and/or the drop. In one embodiment said electromagnetic rays are rays which are within the infrared region of the optical spectrum. In a further embodiment faster evaporation is achieved by further carrying out a step of providing a flow of gas over the metallic surface of the substrate; the gas preferably comprises dry air, dry N2 or dry Argon.

Most preferably, after a drop of sample fluid has been dispensed onto the metallic surface of the substrate, the speed at which the fluid of that drop is evaporated is preferably such that the fluid of that drop is prevented from coming into contact with an edge of said metallic surface. The area of the metallic surface over which the drop(s) of dispensed sample fluid spread depends on the total volume of the drop(s) present on the metallic surface of the substrate. Preferably, the volume of each drop which is dispensed and the rate at which successive drops are dispensed are tuned to ensure that said sample fluid will not spread over more than 80% of the metallic surface of the substrate and get into contact with an edge of the metallic surface. Step (d)—Depositing a Layer of Metal on Said Metallic Surface and Said Particles which Remained on Said Metallic Surface of the Substrate, so that Each of Said Particles is Provided with a Respective Metallic Layer and an Area of the Said Metallic Surface which is without Particles is Provided with a Metallic Layer, Wherein, for Each Particle there is a Gap between the Metallic Layer on the Particle and the Metallic Layer on Said Metallic Surface:

After the steps of bringing said fluid sample into contact said metallic surface of the substrate, and removing said fluid sample from said metallic surface so that particles that were in the sample fluid remain on said metallic surface have been carried out, next the step of depositing a layer of metal on said metallic surface and particles which have remained to said metallic film, so that each of said particles which have remained to said metallic film is provided with a respective metallic layer and said area of the said metallic surface which is without particles is provided with a metallic layer, wherein, for each particle there is a gap between the metallic layer on the particle and the metallic layer on said metallic surface, is carried out. The gaps between each metallic layer on each particle and the metallic layer on said metallic surface, will advantageously serve to provide amplified optical scattering and/or amplified optical absorption. Most preferably step (c) of depositing a layer of metal on said metallic surface and particles which have remained on said metallic surface of the substrate, comprises using physical vapor deposition such as sputtering, pulsed laser deposition, e-beam evaporation or thermal evaporation to deposit the layer of metal on said metallic surface and particles which are on said metallic surface.

It is important that the thickness of the metallic layer which is provided on said metallic surface does not extend above a predefined thickness; said predefined thickness defines the smallest sized particle which can be detected. For example if a particle has a radius of 5 nm and the metallic layer which is provided on said metallic surface has a thickness greater than 5 nm then the particle in question may be completely buried within the metallic layer which is provided on said metallic surface of the substrate; as a result the particle in question will not extend above the metallic layer which is provided on said metallic surface of the substrate and thus will not scatter light and/or absorb light, and so ultimately will not be detected. In order for a particle to be detected a portion of that particle must extend above the metallic layer which is provided on said metallic surface of the substrate, so that portion of the particle can be provided with its own respective metallic layer, and there will be a gap between the metallic layer on the particle and the metallic layer which is provided on said metallic surface of the substrate. Thus, a user chooses a minimum particle size which they wish to detect and ensures that the predefined thickness of the metallic layer which is provided on said metallic surface of the substrate is below said chosen minimum particle size; this will ensure that all particles which have a size above said chosen minimum particle size will protrude above the metallic layer which is provided on said metallic surface of the substrate, and thus can be provided with a respective metallic layer, and there will be a gap between that respective metallic layer on said particle and the metallic layer on said metallic surface of the substrate.

Accordingly, the thickness of the metallic layer which is provided on said metallic surface of the substrate is preferably less than said chosen minimum particle size. However, it is preferable that the gap between the metallic layer on said respective particles and the metallic layer on said metallic surface of the substrate is small (preferably between 1-5 nm), because a smaller gap leads to a strong hybrid plasmon resonance at lower frequencies with stronger electric field enhancement at the gap and ultimately leads to amplified optical absorption and scattering which in turn facilitates particle detection.

Most preferably the thickness of the metallic layer which is provided on said metallic surface of the substrate will be at most half the minimum particle size; this will ensure that particles to be detected do not become completely buried in the metallic layer which is provided on said metallic surface, and also facilitates the formation of gaps which are small enough to achieve good amplification of optical scattering thus allowing for more reliable detection of the particles. For example, providing a metallic layer provided on said metallic surface of the substrate which has a thickness of between 3-7 nm allows for the detection of particles with a size of 10 nm or more.

Said metallic layer on said respective particles can be composed of a single metallic particle, or a plurality of metallic particles (e.g. a plurality of closely-packed metallic nanoparticles).

Steps (e)-(g); (e) Illuminating Said Layers of Metal on Said Particles and Metallic Surface with Electromagnetic Rays, so that Said Electromagnetic Rays are Scattered by Layers of Metal on Said Particles to Produce Respectively Scattered Electromagnetic Rays; or Illuminating Said Layers of Metal on Said Particles and Metallic Surface with Electromagnetic Rays, so that at Least a Portion of Said Electromagnetic Rays are Absorbed by Layers of Metal on Said Particles and Another Portion of Said Electromagnetic Rays are Reflected by the Metallic Surface on the Substrate to Produce Reflected Electromagnetic Rays; (f) Receiving the Scattered Electromagnetic Rays at an Array of Photodiodes; or Receiving the Said Reflected Electromagnetic Rays at an Array of Photodiodes; (g) Forming an Image which Comprises Pixels, Wherein Each Pixel in the Image Corresponds to a Respective Photodiode in Said Array, Wherein the Brightness of Each Pixel in Said Image Corresponds to the Intensity of the Electromagnetic Rays which Photodiode Corresponding to that Pixel Received:

Next said respective layer of metal on each of said respective particles and on the metallic surface is illuminated with electromagnetic rays, so that said electromagnetic rays are scattered by layers of metal on said particles to produce respectively scattered electromagnetic rays (preferably the scattered electromagnetic rays comprises Rayleigh scattered electromagnetic rays); or on each of said respective particles and on the metallic surface is illuminated with electromagnetic rays, so that at least a portion of said electromagnetic rays are absorbed by layers of metal on said particles and another portion of said electromagnetic rays are reflected by the metallic surface on the substrate to produce reflected electromagnetic rays. Then the scattered electromagnetic rays are received at an array of photodiodes; or the reflected electromagnetic rays are received at said array of photodiodes. Then an image is wherein each pixel in the image corresponds to a respective photodiode in said array, wherein the brightness of each pixel in said image corresponds to the intensity of the electromagnetic rays which photodiode corresponding to that pixel received.

In one embodiment said layers of metal on said particles and metallic surface are illuminated with electromagnetic rays in a dark field set up, and at least a portion of said electromagnetic rays are scattered by layers of metal on said particles to produce scattered electromagnetic rays (e.g. Rayleigh scattering). The scattered electromagnetic rays are received at an array of photodiodes and then a dark field image is formed which comprises pixels, wherein each pixel in the dark field image corresponds to a respective photodiode in said array. The color of each pixel in said dark field image corresponds to the intensity of scattered electromagnetic rays which the photodiode corresponding to that pixel received. A photodiode which received a higher proportion of scattered electromagnetic rays will appear brighter than a pixel corresponding to a photodiode that received lesser proportion of scattered electromagnetic rays. In other words, each pixel in the dark field image has a color which corresponds to the intensity of the scattered electromagnetic rays which the corresponding photodiode in the array received. Electromagnetic rays which have been scattered by said layers of metal on said particles create bright colored pixels in the dark field image. In one embodiment the dark field image comprises a monochromatic image; in another embodiment the dark field image comprises a multichromatic image. Using multichromatic images allows determine information about the resonance frequencies of the particles (with its metallic layer on top of the particle and gap between the metallic layer on top of the particle and the metallic layer on the metallic surface of the substrate), which relates to the particle size. Alternatively, to generate a multichromatic image either the scattered or reflected electromagnetic wave are passed through wavelength-filter(s) before being incident on the photodiodes; preferably diffraction gratings may be used to separate the wavelengths before the photodiodes or multichromatic photosensors are used.

In said afore-mentioned embodiment which uses a dark field image, preferably the electromagnetic rays are incident on said the layer of metal on said particles and metallic surface at an angle which is offset to 90 degrees to a plane of the surface of the layer of metal on said metallic surface of the substrate. Preferably the electromagnetic rays are provided by an illuminating said layers of metal on said particles and metallic surface with a broadband illumination (for example with white light).

In another embodiment said layers of metal on said particles and metallic surface are illuminated with electromagnetic rays in a bright field set up, and at least a portion of said electromagnetic rays are absorbed by the layers of metal on said particles, and another portion of said electromagnetic rays are reflected by the metallic surface on the substrate to produce reflected electromagnetic rays. The reflected electromagnetic rays are received at an array of photodiodes and then a bright field image is formed which comprises pixels, wherein each pixel in the bright field image corresponds to a respective photodiode in said array. The color of each pixel in said bright field image corresponds to the intensity of reflected electromagnetic rays which the photodiode corresponding to that pixel received. A photodiode which received a higher proportion of reflected electromagnetic rays will have a corresponding pixel which will appear brighter than a pixel corresponding to a photodiode that received lesser proportion of reflected electromagnetic rays. In this embodiment since a portion of said electromagnetic rays are absorbed by the layers of metal on said particles this will results in a reduction in the number of electromagnetic rays which some of the photodiodes receive.

Each pixel in the bright field image has a colour which corresponds to the intensity of the reflected electromagnetic rays which the corresponding photodiode in the array received. Electromagnetic rays which have been absorbed by said layers of metal on said particles will results in darker colored pixels in the bright field image because the photodiodes corresponding to those pixels will have received less electromagnetic rays due to the absorption of those electromagnetic rays by said layers of metal on said particles. In one embodiment the bright field image comprises a monochromatic image; in another embodiment the bright field image comprises multichromatic image. Using multichromatic images allows to determine information about the resonance frequencies of the particles, which relates to the particle size. Alternatively, to generate a multichromatic image either the electromagnetic waves are passed through wavelength-filter(s) before being incident on the photodiodes; preferably diffraction gratings may be used to separate the wavelengths before the photodiodes or multichromatic photosensors are used.

In said afore-mentioned embodiment which uses a bright field image, electromagnetic rays are incident on said the layer of metal on said particles and metallic surface at an angle which is preferably substantially 90 degrees to a plane of the surface of the layer of metal on said metallic surface of the substrate. Preferably the electromagnetic rays are provided by a illuminating said layers of metal on said particles and metallic surface with a broadband illumination (for example with white light).

In each of the above-mentioned embodiments, preferably the said layers of metal on said particles and metallic surface are illuminated with electromagnetic rays by illuminating said layers of metal on said particles and metallic surface with a broadband illumination (for example with white light).

In yet another embodiment the said layers of metal on said particles and metallic surface are illuminated with electromagnetic rays in both bright-field set up and a dark-field set up so that a bright field image and dark-field image is formed.

In a variation of any of the above-mentioned embodiments, in order to capture the dark field image or bright field image, said layers of metal on said particles and metallic surface are illuminated with electromagnetic rays are illuminated with a plurality of different light sources; in other words the electromagnetic rays, which illuminate said layers of metal on said particles and metallic surface, are provided by a plurality of different light sources. Most preferably said plurality of different light sources comprises plurality of different light sources each with different bands of frequencies; this allows to determine information about the resonance frequencies of the particles, which relates to the particle size.

Step (h)—Processing Said Formed Image to Determine a Characteristic of Said Particles and/or Processing Said Formed Image to Determine a Contamination Characteristic of the Fluid Sample:

Next the image (i.e. dark field image and/or bright field image) which was formed in the afore-mentioned steps is processed. In general the step of processing the image is carried out by inputting the image to a predefined model; where the predefined model defines different combinations of predefined image characteristics and any predefined characteristic (e.g. size; concentration; type) of the particles (in the sample fluid or on the surface) associated with each of the different combinations of predefined image characteristics. The model receives the image; extracts characteristics from said received image; and identifies the combinations of predefined image characteristics which match said extracted characteristics; and outputs the specified characteristic which is associated with said identified combinations of predefined image characteristics which matched said extracted characteristics. It should be understood that the predefined model may take any suitable form; in particular the predefined characteristic of the particles may be any suitable characteristic (e.g. size; concentration; type).

For example, in one embodiment the image which was formed is processed to determine the concentration of particles in the fluid sample: in this embodiment the captured image is input to a predefined model, wherein the predefined model defines different combinations of predefined image characteristics and a particle concentration associated with each of the different combinations of predefined image characteristics. The model receives the image; extracts characteristics from said received image; and identifies the combinations of predefined image characteristics which match said extracted characteristics; and outputs the particle concentration which is associated with said identified combinations of predefined image characteristics which matched said extracted characteristics. The outputted particle concentration defines the concentration of the particles that were on the surface. In another embodiment, the outputted particle concentration defines the concentration of particles in the fluid sample.

For example in one embodiment the model extracts characteristics from said received image the number of pixels which have a grey value which is above a predefined threshold grey value; and determines from said number of pixels which are above said predefined threshold grey value an area which is occupied by the metallic layers on the respective particles. The model then derives the concentration of the particles that were in the fluid sample from this area.

In another example, the image which was formed is processed to determine the size of the particles which clung to the metallic surface of the substrate: in this embodiment the captured image is input to a predefined model, wherein the predefined model defines different combinations of predefined image characteristics and a particle size associated with each of the different combinations of predefined image characteristics. The model receives the image; extracts characteristics from said received image; and identifies the combinations of predefined image characteristics which match said extracted characteristics; and outputs the particle size which is associated with said identified combinations of predefined image characteristics which matched said extracted characteristics. The outputted particle size defines the size of the particles that were in the fluid sample. Specifically, the outputted particle size defines the size of the particles that are on the metallic surface, which defines the size of the particles that were in the fluid sample which was brought into contact with said metallic surface.

In another example, the image which was formed is processed to determine the type of particles which clung to the metallic surface of the substrate: in this embodiment the captured image is input to a predefined model, wherein the predefined model defines different combinations of predefined image characteristics and a type particle associated with each of the different combinations of predefined image characteristics. The model receives the image; extracts characteristics from said received image; and identifies the combinations of predefined image characteristics which match said extracted characteristics; and outputs the particle type which is associated with said identified combinations of predefined image characteristics which matched said extracted characteristics. The outputted particle type defines the type of the particles that were in the fluid sample. Specifically, the outputted particle size defines the size of the particles that are on the metallic surface, which defines the size of the particles that were in the fluid sample which was brought into contact with said metallic surface.

In yet another example, the image which was formed is processed to determine the number of particles which were in the fluid sample: in this embodiment the captured image is input to a predefined model, wherein the predefined model defines different combinations of predefined image characteristics and a number of particles associated with each of the different combinations of predefined image characteristics. The model receives the image; extracts characteristics from said received image; and identifies the combinations of predefined image characteristics which match said extracted characteristics; and outputs the number of particles which is associated with said identified combinations of predefined image characteristics which matched said extracted characteristics. The outputted number of particles defines the number of the particles that were on the surface. In another embodiment, the outputted particle concentration defines the concentration of particles in the fluid sample.

In a preferred embodiment the image which was formed is processed to estimate a contamination characteristic of the fluid sample. In this embodiment the captured image is input to a predefined model, wherein the predefined model defines different combinations of predefined image characteristics and a contamination characteristic of said fluid sample. The model receives the image; extracts characteristics from said received image; and identifies the combinations of predefined image characteristics which match said extracted characteristics; and outputs the contamination characteristic of said fluid sample which is associated with said identified combinations of predefined image characteristics which matched said extracted characteristics. From the contamination characteristic of said fluid sample is preferably the capacity of the fluid sample in contaminating a surface. Most preferably the capacity of the fluid sample in contaminating a surface is a statistical probability of the fluid sample to contaminate a surface (e.g. the surface of a silicon wafer) when the fluid sample contacts said surface.

Optional Reuse of the Substrate:

Optionally, the substrate which was used in the aforementioned steps can be reused. In order to prepare the substrate for reused to perform the above-mentioned steps for another fluid sample. However the substrate must first be prepared before it can be reused. In order to prepare the substrate for reuse, a further metallic film is deposited on the said metallic layer on said metallic surface of the substrate and said respective particles which have clung to said metallic surface of the substrate. The new metallic film will serve to provide the substrate with a new metallic surface, and then steps (b)-(g) can be carried out for said other fluid sample.

According to a further aspect of the present invention there is further provided an assembly, which is operable to execute any of the method embodiment described above, the assembly comprising, a first station comprising a means for depositing a metallic film on a surface of a substrate to provide a smooth, metallic surface on said substrate; a second station comprising a means for flowing said fluid sample over said metallic surface, so that particles in said fluid sample can cling to said metallic surface; a station comprising a means for depositing a layer of metal on said metallic surface and particles which have clung to said metallic film, so that each of said particles which have clung to said metallic film is provided with a respective metallic layer and said area of the said metallic surface which is without particles is provided with a metallic layer, wherein, for each particle there is a gap between the metallic lay on the particle and the metallic layer on said metallic surface; and a fourth station comprising a means for illuminating said layers of metal on said particles and metallic surface with electromagnetic rays, so that said electromagnetic rays can be scattered by layers of metal on said particles to produce Rayleigh scattering; an array of photodiodes which can receive the scattered electromagnetic rays at; a means for forming an image which comprises pixels, wherein each pixel in the image corresponds to a respective photodiode in said array, and wherein the color of each pixel corresponds to the intensity of the electromagnetic rays which the corresponding diode received; and a means for processing said formed image to determine a characteristic of particles that were in the fluid sample.

Various modifications and variations to the described embodiments of the invention will be apparent to those skilled in the art without departing from the scope of the invention as defined in the appended claims. Although the invention has been described in connection with specific preferred embodiments, it should be understood that the invention as claimed should not be unduly limited to such specific embodiment.

The invention claimed is:

1. A method for determining a characteristic of particles in a fluid sample and/or for determining a contamination characteristic of the fluid sample, the method comprising the steps of,
    (a) depositing a metallic film on a surface of a substrate to provide a smooth, metallic surface on said substrate;
    (b) bringing the fluid sample into contact with said metallic surface of the substrate;
    (c) removing said fluid sample which was brought into contact with said metallic surface, from said metallic surface, so that only particles which were in said fluid sample remain on the metallic surface of the substrate;
    (d) depositing a layer of metal on said metallic surface and said particles which remained on said metallic surface of the substrate, so that each of said particles is provided with a respective metallic layer and an area of the said metallic surface which is without particles is provided with a metallic layer, wherein, for each particle there is a gap between the metallic layer on the particle and the metallic layer on said metallic surface;
    (e) illuminating said layers of metal on said particles and metallic surface with electromagnetic rays, so that said electromagnetic rays are scattered by layers of metal on said particles to produce respectively scattered electromagnetic rays; or illuminating said layers of metal on said particles and metallic surface with electromagnetic rays, so that at least a portion of said electromagnetic rays are absorbed by layers of metal on said particles and another portion of said electromagnetic rays are reflected by the metallic surface on the substrate to produce reflected electromagnetic rays;
    (f) receiving the scattered electromagnetic rays at an array of photodiodes; or receiving the said reflected electromagnetic rays at an array of photodiodes;
    (g) forming an image which comprises pixels, wherein each pixel in the image corresponds to a respective photodiode in said array, wherein the brightness of each pixel in said image corresponds to the intensity of the electromagnetic rays which photodiode corresponding to that pixel received;
    (h) processing said formed image to determine a characteristic of said particles and/or processing said formed image to determine a contamination characteristic of the fluid sample.

2. A method according to claim 1, wherein the method comprises the steps of, (a) depositing a metallic film on a surface of a substrate to provide a smooth, metallic surface on said substrate;
(b) bringing the fluid sample into contact with said metallic surface of the substrate;
(c) removing said fluid sample which was brought into contact with said metallic surface, from said metallic surface, so that only particles which were in said fluid sample remain on the metallic surface of the substrate;
(d) depositing a layer of metal on said metallic surface and said particles which remained on said metallic surface of the substrate, so that each of said particles is provided with a respective metallic layer and an area of the said metallic surface which is without particles is provided with a metallic layer, wherein, for each particle there is a gap between the metallic layer on the particle and the metallic layer on said metallic surface;
(e) illuminating said layers of metal on said particles and metallic surface with electromagnetic rays, so that said electromagnetic rays are scattered by layers of metal on said particles to produce scattered electromagnetic rays;
(f) receiving the scattered electromagnetic rays at an array of photodiodes;
(g) forming a dark field image which comprises pixels, wherein each pixel in the image corresponds to a respective photodiode in said array, wherein the brightness of each pixel in said image corresponds to the intensity of the scattered light which photodiode corresponding to that pixel received;
(h) processing said dark field image to determine a characteristic of said particles and/or processing said dark field image to determine a contamination characteristic of the fluid sample.

3. A method according to claim 2 wherein the scattered electromagnetic rays comprise Rayleigh scattered electromagnetic rays.

4. A method according to claim 1 wherein the method comprises the steps of
(a) depositing a metallic film on a surface of a substrate to provide a smooth, metallic surface on said substrate;
(b) bringing the fluid sample into contact with said metallic surface of the substrate;
(c) removing said fluid sample which was brought into contact with said metallic surface, from said metallic surface, so that only particles which were in said fluid sample remain on the metallic surface of the substrate;
(d) depositing a layer of metal on said metallic surface and said particles which remained on said metallic surface of the substrate, so that each of said particles is provided with a respective metallic layer and an area of the said metallic surface which is without particles is provided with a metallic layer, wherein, for each particle there is a gap between the metallic layer on the particle and the metallic layer on said metallic surface;
(e) illuminating said layers of metal on said particles and metallic surface with electromagnetic rays, so that at least a portion of said electromagnetic rays are absorbed by layers of metal on said particles and another portion of the electromagnetic rays are reflected by the metallic surface on the substrate to produce reflected electromagnetic rays;
(f) receiving the reflected electromagnetic rays at an array of photodiodes;
(g) forming a bright field image which comprises pixels, wherein each pixel in the bright field image corresponds to a respective photodiode in said array, wherein the brightness of each pixel in said bright field image corresponds to the intensity of the light which photodiode corresponding to that pixel received;
(h) processing said bright field image to determine a characteristic of said particles and/or processing said bright field image to determine a contamination characteristic of the fluid sample.

5. A method according to claim 1 wherein the contamination characteristic of the fluid sample is the capacity of a fluid sample to contaminate a surface when the fluid sample is brought into contact with said surface.

6. A method according to claim 1 wherein said step of processing said formed image to determine a characteristic of particles that were in the fluid sample, comprises processing said formed image to determine one or more of, the number of particles in the fluid sample; the concentration of particles in the fluid sample; the type of particles in the fluid sample; and/or the size of particles in the fluid sample.

7. A method according to claim 1 further comprising the step of spinning the substrate as said sample fluid is brought into contact with the metallic surface of the substrate.

8. A method according to claim 1 further comprising the step of evaporating the sample fluid from the metallic surface.

9. A method according to claim 1 further comprising selecting a minimum size of the particles whose characteristic is to be determined; and wherein the step of depositing a layer of metal on said metallic surface and particles on said metallic film, comprises depositing a layer of metal on said metallic surface and particles which has a thickness which is less than the selected minimum size of the particles.

10. A method according to claim 1 wherein the step of processing said formed image to determine a characteristic of particles that were in the fluid sample, comprises inputting the image to a predefined model; where the predefined model defines different combinations of predefined image characteristics and a predefined characteristic of the particles being associated with each of the different combinations of predefined image characteristics; extracting characteristics from said image; and identifying a combinations of predefined image characteristics which matches said extracted characteristics; and outputting a predefined characteristic which is associated with said identified combinations of predefined image characteristics which matched said extracted characteristics.

11. A method according to claim 1 said method further comprises the step of depositing a sticking layer on said surface of said substrate, and wherein step (a) comprises depositing said metallic film on said sticking layer.

12. A method according to claim 1 wherein the method further comprises depositing a further metallic film on said layers of metal on said particles and metallic surface of the substrate so as to provide a new metallic surface on said substrate, so that the substrate can be reused.

13. A method according to claim 12 wherein the method further comprises repeating at least steps (b)-(h), using the said substrate, for another fluid sample.

14. An assembly, which is operable to execute the method according to claim 1 comprising,
a first station configured to bring the fluid sample into contact with said metallic surface of the substrate;
a second station configured to remove said fluid sample which was brought into contact with said metallic surface, from said metallic surface, so that only particles which were in said fluid sample remain on the metallic surface of the substrate;
a third station configured to deposit a layer of metal on said metallic surface and said particles which remained on said metallic surface of the substrate, so that each of said particles is provided with a respective metallic layer and an area of the said metallic surface which is without particles is provided with a metallic layer, wherein, for each particle there is a gap between the metallic layer on the particle and the metallic layer on said metallic surface;

a fourth station configured to illuminate said layers of metal on said particles and metallic surface with electromagnetic rays, so that said electromagnetic rays are scattered by layers of metal on said particles to produce respectively scattered electromagnetic rays; or illuminating said layers of metal on said particles and metallic surface with electromagnetic rays, so that at least a portion of said electromagnetic rays are absorbed by layers of metal on said particles and another portion of said electromagnetic rays are reflected by the metallic surface on the substrate to produce reflected electromagnetic rays;

a fifth station comprising an array of photodiodes which can receive the scattered electromagnetic rays at an array of photodiodes; or which can receive said reflected electromagnetic rays;

a sixth station configured to form an image which comprises pixels, wherein each pixel in the image corresponds to a respective photodiode in said array, wherein the brightness of each pixel in said image corresponds to the intensity of the electromagnetic rays which photodiode corresponding to that pixel received; and a seventh station configured to process said formed image to determine a characteristic of said particles.

* * * * *